United States Patent [19]
Toh

[11] Patent Number: 5,901,367
[45] Date of Patent: May 4, 1999

[54] LOW INSERTION LOSS CONNECTION OF AN ANTENNA TO A MOBILE RADIO

[75] Inventor: Alex Toh, San Diego, Calif.

[73] Assignee: Hughes Electronics Corporation, El Segundo, Calif.

[21] Appl. No.: 08/872,583

[22] Filed: Jun. 10, 1997

[51] Int. Cl.[6] .................................................. H04B 1/38
[52] U.S. Cl. ........................ 455/575; 455/90; 455/129; 455/351; 379/455; 343/702; 343/900; 343/901
[58] Field of Search ............................ 455/575, 90, 569, 455/570, 95, 128, 129, 269, 280, 347, 348–349, 351, 97, 344–346; 343/702, 900, 901; 379/428, 454–455

[56] References Cited

U.S. PATENT DOCUMENTS

| | | | |
|---|---|---|---|
| 4,525,718 | 6/1985 | Imazeki et al. | 343/901 |
| 5,302,963 | 4/1994 | Wiggenhorn | 343/702 |
| 5,336,896 | 8/1994 | Katz | 455/90 |
| 5,357,262 | 10/1994 | Blaese | 343/702 |
| 5,551,080 | 8/1996 | Chambers et al. | 455/129 |
| 5,562,464 | 10/1996 | Lecourtois | 343/702 |
| 5,668,561 | 9/1997 | Perrotta et al. | 343/702 |
| 5,684,672 | 11/1997 | Karidis et al. | 343/702 |

*Primary Examiner*—Doris H. To
*Attorney, Agent, or Firm*—John T. Whelan; Michael W. Sales

[57] ABSTRACT

An approach for connection of an antenna employs an antenna including at least one antenna contact; an antenna collar slidably coupleable with the antenna and including at least one antenna feedpoint; and an antenna coupler/connector insertable into the antenna collar. The approach may also be characterized as involving moving an antenna by sliding the antenna within an antenna collar, moving an antenna contact at an end of the antenna away from an antenna feedpoint in the antenna collar; and inserting an antenna coupler/connector into the antenna collar including contacting the antenna feedpoint with a contact pad on the antenna coupler/connector. As an alternative the approach of the present invention may have an antenna including at least one antenna contact; an antenna collar slidably coupleable with the antenna and including at least one antenna feedpoint; a cavity enveloping the antenna when the at least one antenna contact is displaced away from the at least one antenna feedpoint; and a spring interposed between the basal end of the antenna and a basal end of the cavity for moving the antenna when the at least one antenna contact is not displaced away from the at least one antenna feedpoint.

19 Claims, 4 Drawing Sheets

LOW INSERTION LOSS CONNECTION OF AN ANTENNA TO A MOBILE RADIO

BACKGROUND OF THE INVENTION

The present invention relates to low insertion loss connection of an antenna to a mobile radio, and more particularly to low insertion loss connection of an antenna to a satellite telephone.

In non-satellite transceivers, such as conventional cellular telephones, a connection to an external vehicular antenna can be made through a radio frequency connector normally located on the bottom of the telephone. In order to prevent both the phone antenna and the external vehicular antenna from radiating radio frequency energy at the same time, which can cause phasing and other problems, a radio frequency switch in the conventional cellular telephone switches internal connections from the telephone antenna to the external vehicular antenna connected to the frequency connector, when a connection is detected.

In satellite transceiver applications, such as in satellite telephones, the use of a radio frequency switch for the purpose of switching internal connections from the phone antenna to the external vehicular antenna is not desirable due to the high insertion loss of the radio frequency switch. This high insertion loss is particularly problematic in satellite telephones because of the limited loss budget due to the greater distance between the satellite telephone and an earth orbit satellite with which it communicates. In order to make up this loss on the satellite side, by building a more sophisticated satellite, extremely high costs would be involved, such as on the order of 40 million dollars.

One way in which to eliminate the radio frequency switch is to simply use a detachable connector to connect the phones antenna to the satellite telephones, and when use of the external vehicular antenna is desired to remove the telephone antenna and to connect vehicular antenna to the site on the satellite telephone from which the phone antenna was removed. This approach is, however, awkward and time consuming, and therefore not highly desirable.

Another approach is to employ an inductive coupler that, when the satellite telephone is inserted into a docking adaptor in the vehicle, surrounds the telephone antenna (or a portion thereof) providing an inductive link between the external antenna and the satellite telephone. This approach, however, fails to achieve direct contact or close capacitive coupling between the vehicular external antenna and the satellite telephone, and thus also suffers from high insertion loss.

The present invention advantageously addresses the above and other needs.

SUMMARY OF THE INVENTION

The present invention advantageously addresses the needs above as well as other needs by providing a low insertion loss connection of an antenna to a mobile radio.

In one embodiment, the invention can be characterized as a system for low insertion loss connection of an antenna to a mobile radio. Such embodiment employs an antenna including at least one antenna contact at a basal end thereof; an antenna collar slidably coupleable with the antenna and including at least one antenna feedpoint alignable with the at least one antenna contact when the antenna is in an extended position; and an antenna coupler/connector insertable into the antenna collar. The antenna coupler/connector includes an end for displacing the antenna contact away from the antenna feedpoint. The antenna coupler/connector including at least one contact pad alignable with the antenna feedpoint when the antenna contact is displaced away from the antenna feedpoint.

In another embodiment, the invention can be characterized as a method for low insertion loss connection of an antenna to a mobile radio. The method involves the steps of moving an antenna by sliding the antenna within an antenna collar, including moving the antenna from an extended position to a retracted position and moving an antenna contact at a basal end of the antenna away from an antenna feedpoint in the antenna collar; and inserting an antenna coupler/connector into the antenna collar including moving the antenna from the retracted position to a depressed position, and further including contacting or capacitively coupling the antenna feedpoint in the antenna collar with a contact pad on the antenna coupler/connector.

In an even further embodiment, the invention can be characterized as a system for low insertion loss connection of an antenna to a mobile radio. This system of this embodiment has an antenna including at least one antenna contact at a basal end; an antenna collar slidably coupleable with the antenna and including at least one antenna feedpoint alignable with the at least one antenna contact when the antenna is in an extended position; a cavity enveloping the antenna when the at least one antenna contact is displaced away from the at least one antenna feedpoint; and a spring interposed between the basal end of the antenna and a basal end of the cavity for moving the antenna from a depressed position into a retracted position when the at least one antenna contact is not displaced away from the at least one antenna feedpoint.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
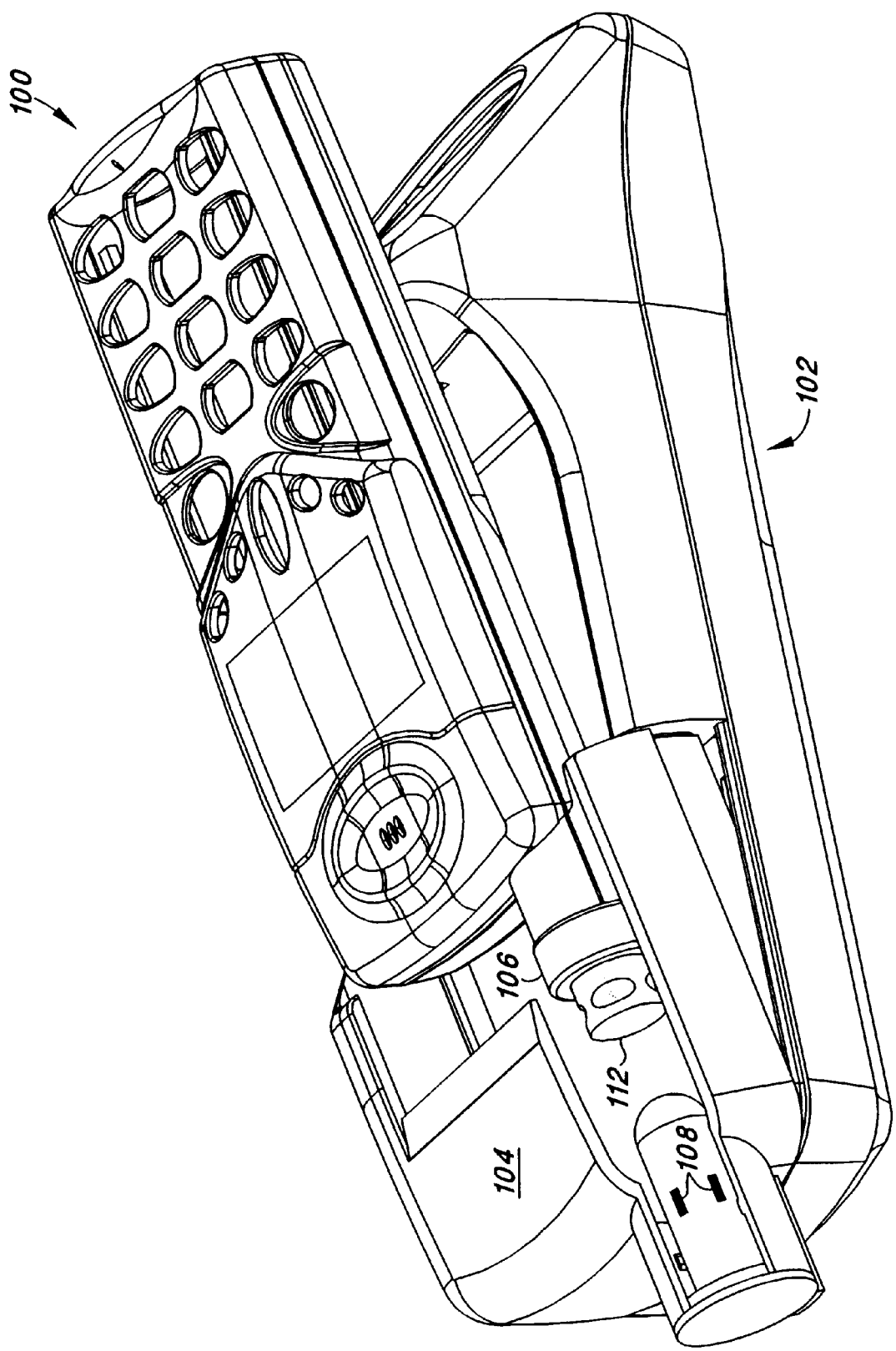
FIG. 1 is a perspective view, partially in section, of a satellite telephone as it is inserted into a docking adaptor.

Referring first to FIG. 1, a perspective view is shown, partially in section, of a satellite telephone 100 as it is inserted into a docking adaptor 102. Shown are a swivel pocket 104, an antenna collar 106, contact pads 108, an antenna coupler/connector 110 and a satellite telephone antenna 112.

The antenna coupler/connector 110 engages as the satellite telephone 100 is docked into the docking adaptor 102. The swivel pocket 104 guides the satellite telephone 100 into the docking adaptor 102 and lines up the antenna collar 106 with the antenna coupler/connector 110 for blind insertion. The contact pads 108 contact or become capacitively coupled with the antenna feedpoints (not shown) on the inside wall of the antenna collar 106 as it is inserted into the antenna collar 106. The antenna coupler/connector 110 pushes the satellite telephone 112 antenna into the satellite telephone 100 as the satellite telephone 100 is inserted into the swivel pocket 104.

Figure 2:
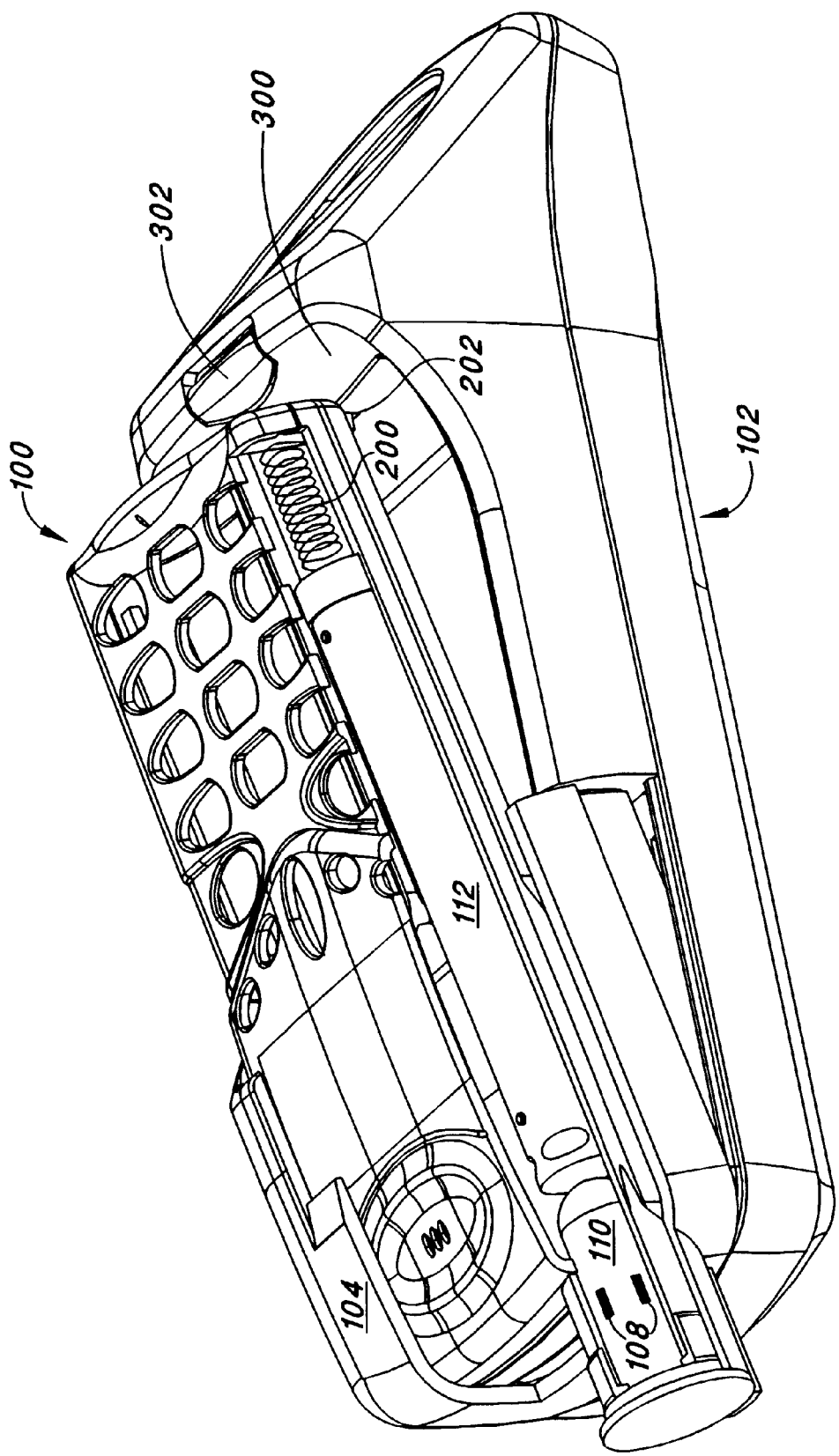
FIG. 2 is a perspective view, partially in section, of the satellite telephone of FIG. 1 fully inserted into a swivel pocket.

Referring next to FIG. 2, a perspective view is shown, partially in section, of the satellite telephone 100 fully inserted into the swivel pocket 104. Shown are the satellite telephone antenna 112, the swivel pocket 104, the contact pads 108, the antenna coupler/connector 110 and the satellite telephone 100. Also shown is a spring 200 within the satellite telephone that normally holds the satellite telephone antenna 112 in a position at least protruding from the satellite telephone 100. The satellite telephone antenna 112 is pushed into the satellite telephone 100 by the antenna coupler/connector 110, thus pressing the spring 200, so as to allow the antenna coupler/connector 110 to connect the antenna feedpoints (not shown) in the antenna collar 106 to the contact pads 108. Thus, the antenna feedpoints inside the antenna collar 106 connect to the satellite telephone antenna 112 when the satellite telephone antenna 110 is deployed, i.e., extended, but connect to the contact pads 108 of the antenna coupler/connector 110 when the antenna coupler/connector 110 is inserted into the antenna collar 106.

Figure 3:
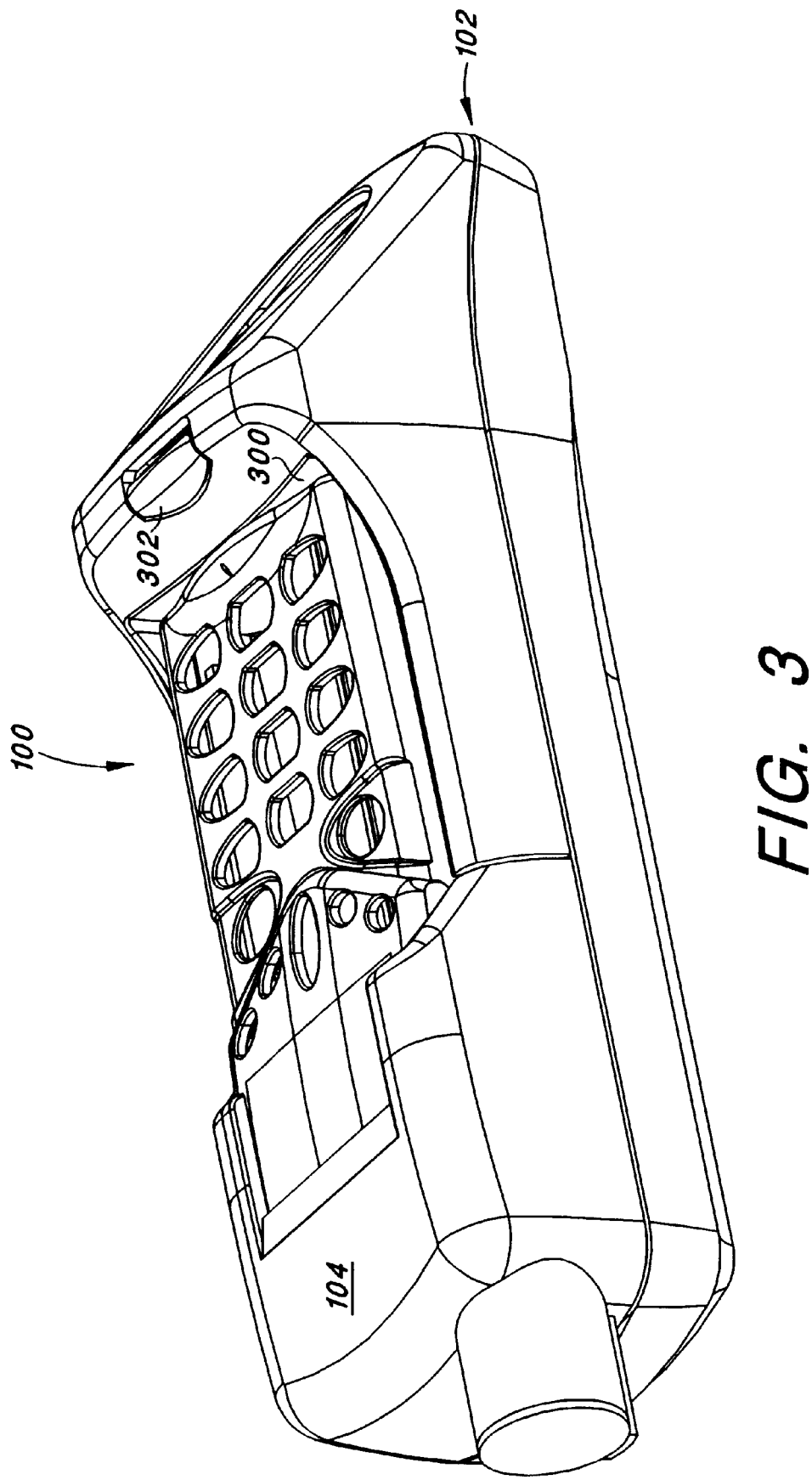
FIG. 3 is a perspective view of the satellite telephone of FIG. 1 fully inserted into the docking adaptor.

Referring next to FIG. 3, a perspective view is shown of the satellite telephone 100 fully inserted into the docking adaptor 102. The satellite telephone 100 and the swivel pocket 104 are pivoted down so as to lock the satellite telephone 100 into place within the docking adaptor 102. A latch (see 202 in FIG. 2) locks the satellite telephone 100 in a down position, and contact points (not shown) on the bottom of the satellite telephone 100 mate up with battery charging and data connector connections (not shown) on a back wall 300 of the docking adaptor 102 when the satellite telephone 100 is pushed down. A release button 302 is provided to release the satellite telephone 100, which is, upon release, lifted out of the docking adaptor 102 by the swivel pocket 104.

Figure 4:
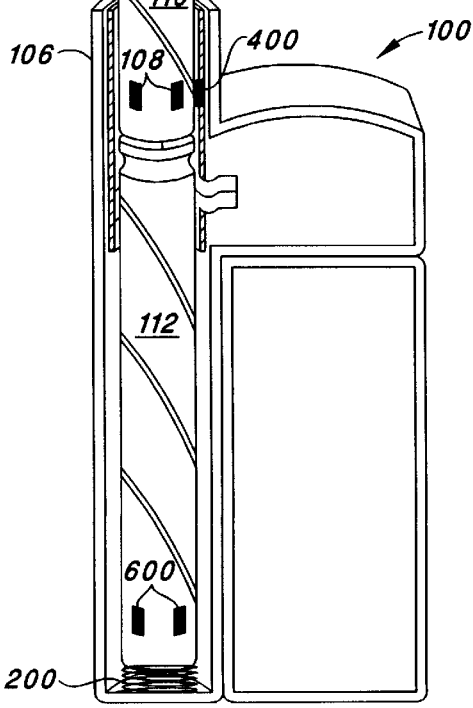
FIG. 4 is a cross-sectional view of the satellite telephone of FIG. 1, with an antenna coupler/connector inserted therein so as to move a satellite telephone antenna into a depressed position, such as would be the case when the satellite telephone is inserted into the docking adaptor.

Referring next to FIG. 4, a cross-sectional view is shown of the satellite telephone 100, with the antenna coupler/connector 110 inserted therein so as to move the satellite telephone antenna 112 into a depressed position, such as would be the case when the satellite telephone 100 is inserted into the docking adaptor 102. Shown are the antenna coupler/connector 110, the antenna 112, the antenna collar 106, the contact pads 108, and the spring 200.

As can be seen, the antenna coupler/connector 110 displaces the antenna 112 downwardly, thereby depressing the spring 200, so as to move the satellite telephone antenna 112 away from the antenna collar 106. In moving the satellite telephone antenna 112 away from the antenna collar 106, the satellite telephone antenna 112 is also moved away from the antenna feedpoints 400, which, upon insertion of the antenna coupler/connector 110, are connected to the contact pads 108 on the antenna coupler/connector 110 by means of a direct contact or close capacitive coupling, thereby providing a connection between the satellite telephone 100 and the external vehicular antenna (not shown). In this position the satellite telephone antenna 112 is disabled, and the external vehicular antenna (not shown) is ready for use such as when the satellite telephone 100 is used in a vehicular, docked mode. The external vehicular antenna is coupled to the antenna coupler/connector 110 via a coaxial cable 402.

Figure 5:
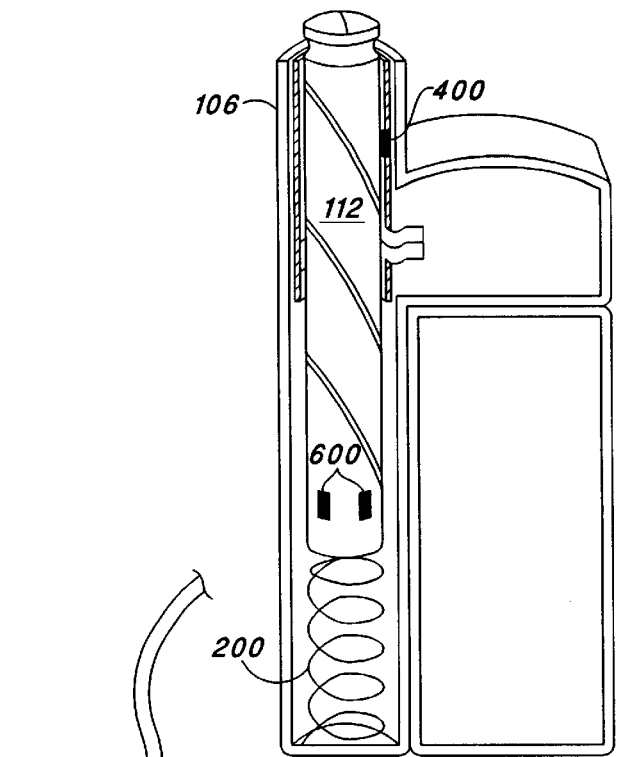
FIG. 5 is a cross-sectional view of the satellite telephone of FIG. 1, with the antenna coupler/connector removed and the satellite telephone antenna pushed upwardly by a spring into a retracted position.

Referring next to FIG. 5, a cross-sectional view is shown of the satellite telephone 100, with the antenna coupler/connector (not shown) removed and the satellite telephone antenna 112 pushed upwardly by the spring 200 into a retracted position. Shown are the satellite telephone antenna 112, the antenna collar 106, the antenna feedpoints 400 and the spring 200. In the position shown, i.e., the retracted position, an end of the satellite telephone antenna 112 is reachable by a user of the satellite telephone 100, such that the satellite telephone antenna 112 can be extended from the satellite telephone 110. However, in the retracted position, the satellite telephone antenna 112 remains out of the way of the user, and is protected from potential damage during handling of the satellite telephone 100.

Figure 6:
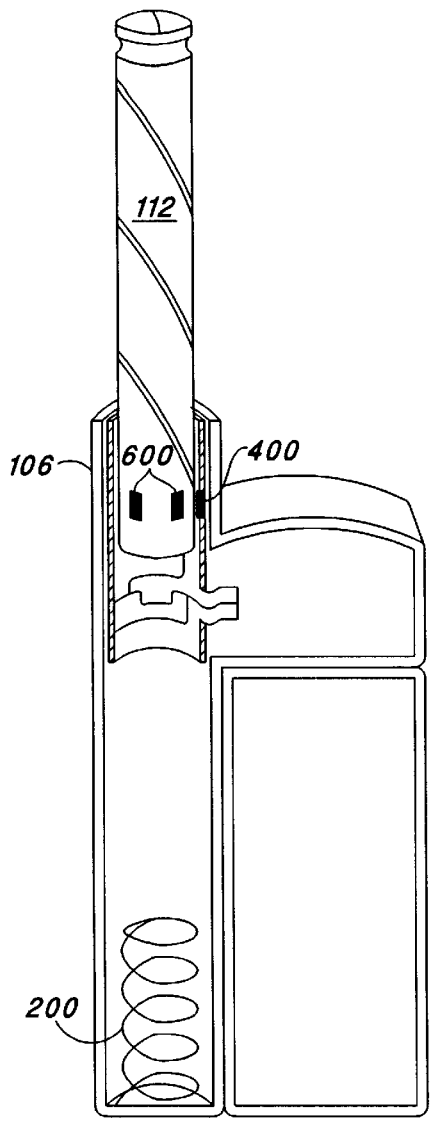
FIG. 6 is a cross-sectional view of the satellite telephone of FIG. 1 wherein the satellite telephone antenna is in an extended portion.

Referring next to FIG. 6, a cross-sectional view is shown of the satellite telephone 100 when the satellite telephone antenna 112 is in an extended portion. Shown are the antenna 112, the antenna collar 106, the antenna feedpoints 400, and the spring 200. Also shown are antenna contacts 600 on the satellite telephone antenna 112. In the extended position, which is achieved by the user pulling the end of the satellite telephone antenna 112 from the retracted position into the extended position by grasping the end of the satellite telephone antenna 112 while the satellite telephone antenna is in the retracted position and extending the satellite telephone antenna 112, the antenna contacts 600 at a base of the satellite telephone antenna 112 contact or become capacitively coupled with the antenna feedpoints 600, thereby coupling the satellite telephone antenna 112 to the satellite telephone 100. In this position, the satellite telephone antenna 112 is ready for use, such as when the satellite telephone 100 is used in a mobile, hand-held mode.

In particular, and as illustrated in FIGS. 4 through 6, it should be noted that the antenna contacts 600 are moved a significant distance away from the antenna 400 feedpoints when the satellite telephone antenna is in the depressed position (FIG. 4) and the antenna coupler/connecter 110 is inserted into the satellite telephone 110. This distance is important in order to prevent capacitive or inductive coupling between the antenna feedpoints 400 and the antenna contacts 600 during operation in docked mode, which would result in high insertion losses. When the satellite telephone 112 antenna is in the extended position, however, the antenna contacts 600 are brought into contact with or into extremely close proximity with the antenna feedpoints 400 so as to couple the satellite telephone antenna 112 to the satellite telephone 100 with very little insertion loss.

While the invention herein disclosed has been described by means of specific embodiments and applications thereof, numerous modifications and variations could be made thereto by those skilled in the art without departing from the scope of the invention set forth in the claims.

What is claimed is:

1. A system for low insertion loss connection of an antenna to a mobile radio comprising:

the antenna including at least one antenna contact at a basal end thereof;

an antenna collar including at least one antenna feedpoint alignable with the at least one antenna contact when the antenna is in an extended position, the antenna being slidably coupleable with the antenna collar; and an antenna coupler/connector removably insertable into the antenna collar, wherein the antenna coupler/connector is connectable to the antenna when the antenna coupler/connector is inserted into the antenna collar and mechanically separable from the antenna when the antenna coupler/connector is removed from the antenna collar, the antenna coupler/connector including an end for displacing the at least one antenna contact away from the at least one antenna feedpoint, the antenna coupler/connector including at least one coupler pad alignable with the at least one antenna feedpoint when the at least one antenna contact is displaced away from the at least one antenna feedpoint.

2. The system of claim 1 further comprising:

a cavity enveloping said antenna when said at least one antenna contact is displaced away from said at least one antenna feedpoint.

3. The system of claim 1 further comprising:

a spring interposed between said basal end of said antenna and a basal end of said cavity for moving said antenna from a depressed position into a retracted position when said at least one antenna contact is not displaced away from said at least one antenna feedpoint by the antenna coupler/connector.

4. The system of claim 1 further comprising:

a satellite transceiver coupled to said at least one antenna feedpoint of said antenna collar.

5. The system of claim 4 further comprising:

a docking adaptor, the docking adaptor including said antenna coupler/connector.

6. The system of claim 5 wherein the docking adaptor further includes a mobile radio locking means.

7. The system of claim 6 wherein the locking means includes a latch whereby the latch locks the mobile radio to the docking adaptor.

8. The system of claim 6 wherein the docking adaptor further includes a mobile radio unlocking means.

9. The system of claim 8 wherein the unlocking means includes a release button whereby the release button unlocks the mobile radio from the docking adaptor.

10. A method for low insertion loss connection of an antenna to a mobile radio comprising:

moving the antenna by sliding the antenna within an antenna collar, the moving including moving the antenna from an extended position to a retracted position including moving an antenna contact at a basal end of the antenna away from an antenna feedpoint in the antenna collar;

mechanically coupling an antenna coupler/connector to the antenna collar, wherein the antenna coupler/connector and the antenna are physically and mechanically separate prior to the step of mechanically coupling the antenna coupler/connector to the antenna collar; and inserting the antenna coupler/connector into the antenna collar including bringing the antenna coupler/connector proximate to the antenna and moving the antenna from the retracted position to a depressed position, and further including contacting the antenna feedpoint in the antenna collar with a contact pad on the antenna coupler/connector.

11. The method of claim 10 wherein said moving of said antenna by sliding said antenna within said antenna collar includes moving said antenna into a cavity.

12. The method of claim 10 further comprising:

mechanically removing said antenna coupler/connector from said antenna collar including separating said antenna coupler/connector from said antenna; and moving said antenna from said depressed position to said retracted position using a spring, including disconnecting said antenna feedpoint in said antenna collar from said contact pad on said antenna coupler/connector.

13. A system for low insertion loss connection of an antenna to a mobile radio comprising:

the antenna including at least one antenna contact at a basal end thereof;

an antenna collar including at least one antenna feedpoint alignable with the at least one antenna contact when the antenna is in an extended position, the antenna being slidably coupleable with the antenna collar;

a satellite transceiver coupled to said at least one antenna feedpoint of said antenna collar; and a docking adaptor, the docking adaptor including an antenna coupler/connector insertable into the antenna collar, the antenna coupler/connector including an end for displacing the at least one antenna contact away from the at least one antenna feedpoint, the antenna coupler/connector including at least one coupler pad alignable with the at least one antenna feedpoint when the at least one antenna contact is displaced away from the at least one antenna feedpoint.

14. The system of claim 13 wherein the docking adaptor further includes a mobile radio locking means.

15. The system of claim 14 wherein the locking means includes a latch whereby the latch locks the portable radio to the docking adaptor.

16. The system of claim 14 wherein the docking adaptor further includes a mobile radio unlocking means.

17. The system of claim 16 wherein the unlocking means includes a release button whereby the release button unlocks the portable radio from the docking adaptor.

18. The system of claim 13 further comprising:

a cavity enveloping said antenna when said at least one antenna contact is displaced away from said at least one antenna feedpoint.

19. The system of claim 13 further comprising:

a spring interposed between said basal end of said antenna and a basal end of said cavity for moving said antenna from a depressed position into a retracted position when said at least one antenna contact is not displaced away from said at least one antenna feedpoint by the antenna coupler/connector.

* * * * *